US010661793B2

(12) United States Patent
Minemura

(10) Patent No.: US 10,661,793 B2
(45) Date of Patent: May 26, 2020

(54) VEHICLE CONTROL APPARATUS AND VEHICLE CONTROL METHOD

(71) Applicant: DENSO CORPORATION, Kariya, Aichi-pref. (JP)

(72) Inventor: Akitoshi Minemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 110 days.

(21) Appl. No.: 15/767,751

(22) PCT Filed: Oct. 13, 2016

(86) PCT No.: PCT/JP2016/080367
§ 371 (c)(1),
(2) Date: Apr. 12, 2018

(87) PCT Pub. No.: WO2017/065212
PCT Pub. Date: Apr. 20, 2017

(65) Prior Publication Data
US 2018/0297591 A1 Oct. 18, 2018

(30) Foreign Application Priority Data
Oct. 14, 2015 (JP) .................................. 2015-203112

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/08* (2013.01); *B60W 30/09* (2013.01);
(Continued)

(58) Field of Classification Search
CPC ...... B60W 30/08; B60W 40/00; B60W 50/14; B60W 2550/10; B60W 2710/18; B60W 2710/20; B60T 8/17558
See application file for complete search history.

(56) References Cited

U.S. PATENT DOCUMENTS 10,246,089 B2 * 4/2019 Sasabuchi ......... B60W 30/0953
10,407,060 B2 * 9/2019 Kim ...................... G01S 13/865
(Continued)

FOREIGN PATENT DOCUMENTS

JP 2015-79332 A 4/2015

*Primary Examiner* — Thomas G Black
*Assistant Examiner* — Ce Li Li
(74) *Attorney, Agent, or Firm* — Knobbe, Martens, Olson & Bear, LLP

(57) ABSTRACT

A vehicle control apparatus includes a collision time calculation section configured to calculate a time-to-collision; an activation region setting section configured to set an activation region to an area present ahead of and in the travelling direction of an own vehicle, the activation region having a predetermined width in a lateral direction that is orthogonal to a path of the own vehicle; a timing setting section configured to set timing activating a safety device; a determination region setting section configured to set a determination region to an area present diagonally ahead of and in the travelling direction of the own vehicle, the determination region having a predetermined width in the lateral direction; a timer section configured to measure a time for which a target stays in the determination region; a correction section configured to perform, in a case where the time measured by the timer section is long, a process for decreasing the width of the activation region and a process for decreasing activation timing; and an activation determination section configured to activate the safety device in a case where a position of the target is in the activation region and the time-to-collision falls below the activation timing.

13 Claims, 12 Drawing Sheets

(51) Int. Cl.
*B60W 40/00* (2006.01)
*G08G 1/16* (2006.01)
*B60W 30/08* (2012.01)
*B60W 50/14* (2020.01)

(52) U.S. Cl.
CPC ............ *B60W 40/00* (2013.01); *B60W 50/14* (2013.01); *G08G 1/16* (2013.01); *G08G 1/165* (2013.01); *G08G 1/166* (2013.01); *B60W 2550/10* (2013.01); *B60W 2710/18* (2013.01); *B60W 2710/20* (2013.01)

(56) References Cited

U.S. PATENT DOCUMENTS

| | | | | |
|---|---|---|---|---|
| 2014/0324330 | A1* | 10/2014 | Minemura | G08G 1/16 701/301 |
| 2014/0350785 | A1* | 11/2014 | Tsuchida | B60W 50/00 701/36 |
| 2015/0283999 | A1* | 10/2015 | Igarashi | G08G 1/165 701/1 |
| 2015/0329046 | A1* | 11/2015 | Igarashi | G08G 1/165 340/435 |

* cited by examiner

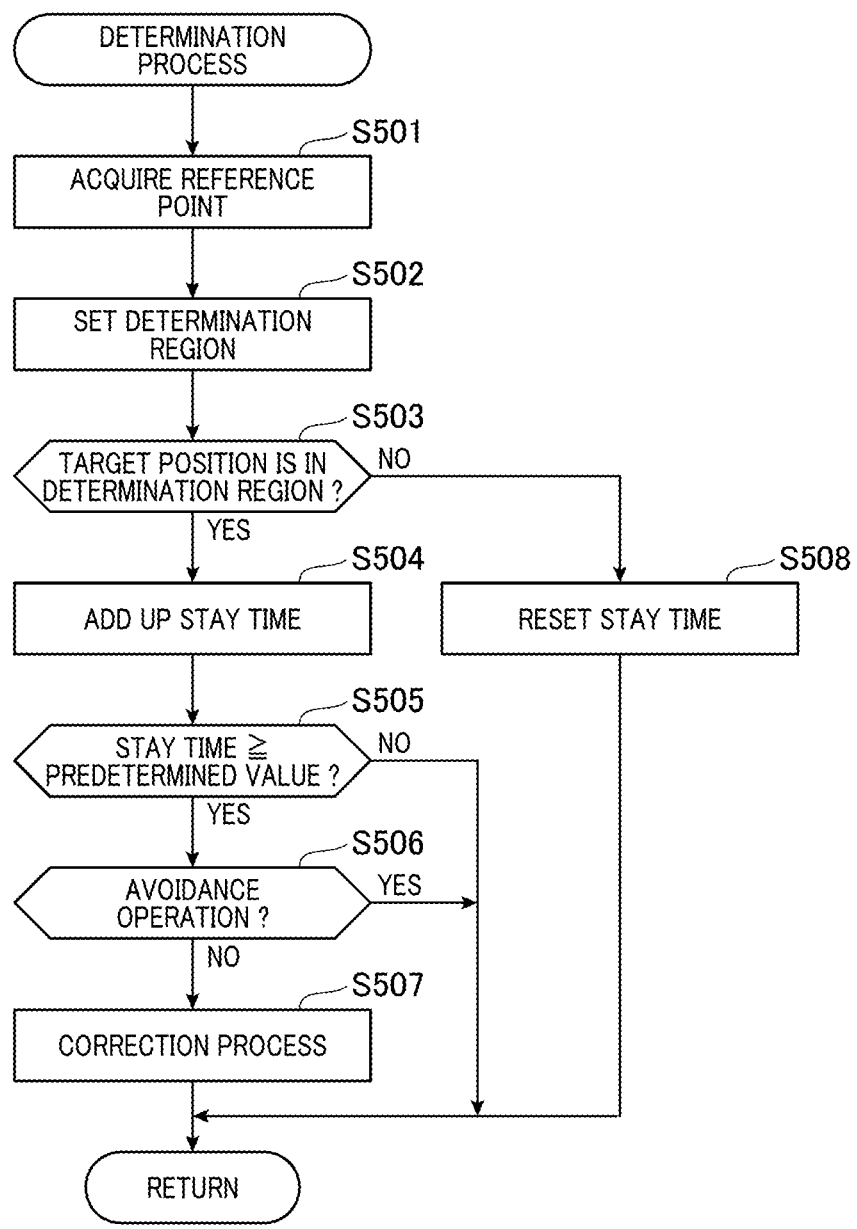

VEHICLE CONTROL APPARATUS AND VEHICLE CONTROL METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present invention relates to a vehicle control apparatus and a vehicle control method for activating a safety device to avoid a collision with a target.

BACKGROUND ART

Conventionally, pre-crash safety (PCS) has been realized, which reduces or prevents damage due to a collision of an own vehicle with an obstacle (a target) positioned ahead of the own vehicle and in the travelling direction thereof, such as another vehicle, a pedestrian, or a road structure. In the PCS, a time-to-collision (TTC) as a time until a collision between the own vehicle and the obstacle occurs is obtained based on a relative distance between the own vehicle and the obstacle and a relative speed or a relative acceleration between the own vehicle and the obstacle. Based on the time-to-collision, a warning device informs the driver of the own vehicle of the approach to the obstacle, or a braking device of the own vehicle is activated.

Regarding the PCS, there is a vehicle control apparatus described in Patent Literature 1. In the vehicle control apparatus described in Patent Literature 1, a blind region is defined ahead of a own vehicle and in the travelling direction thereof, and the control of decelerating the own vehicle is performed in the case where a target stays in the blind region for a predetermined time or longer.

CITATION LIST

Patent Literature

[Patent Literature 1] JP-A-2015-79332

SUMMARY OF THE INVENTION

Technical Problem

Meanwhile, when a safety device is activated for avoiding a collision with a two-wheel vehicle such as a bicycle traversing the area present ahead of the own vehicle and in the travelling direction thereof, the safety device needs to be activated at such a time point that the two-wheel vehicle is present diagonally ahead of the own vehicle and in the travelling direction thereof. However, the two-wheel vehicle might travel in the same direction as that of the own vehicle diagonally ahead of the own vehicle and in the travelling direction thereof while swaying in the crosswise direction. In this state, when the approach of the two-wheel vehicle to the own vehicle due to swaying is determined as movement across the front area present ahead of the own vehicle, the safety device of the own vehicle may be needlessly activated.

Solution to Problem

One embodiment provides a vehicle control apparatus that can prevent unnecessary activation of a safety device for a target having a low probability of traversing an area present ahead of and in a travelling direction of an own vehicle.

One embodiment provides a vehicle control apparatus for activating, as a safety device, a device configured to avoid a collision of an own vehicle with a target present ahead of and in a travelling direction of the own vehicle or reduce damage of the collision when a risk of the collision is increased. The apparatus includes: a collision time calculation section configured to calculate a time-to-collision, which is a time until the own vehicle and the target collide with each other; an activation region setting section configured to set an activation region to an area present ahead of and in the travelling direction of the own vehicle, the activation region having a predetermined width in a lateral direction that is orthogonal to a path of the own vehicle; a timing setting section configured to set activation timing for determining, by comparison with the time-to-collision, whether or not the safety device is to be activated; a determination region setting section configured to set a determination region to an area present diagonally ahead of and in the travelling direction of the own vehicle, the determination region having a predetermined width in the lateral direction; a timer section configured to measure a time for which the target stays in the determination region; a correction section configured to perform, in a case where the time measured by the timer section is equal to or more than a predetermined value, a correction process as at least one of a process for decreasing the width of the activation region compared with a case where the time is shorter than the predetermined value and a process for decreasing the activation timing compared with the case where the time is shorter than the predetermined value; and an activation determination section configured to activate the safety device in a case where a position of the target is in the activation region and the time-to-collision falls below the activation timing.

BRIEF DESCRIPTION OF THE DRAWINGS

FIG. 16 shows a subroutine of a determination process in a fourth embodiment.

DESCRIPTION OF EMBODIMENTS

Figure 1:
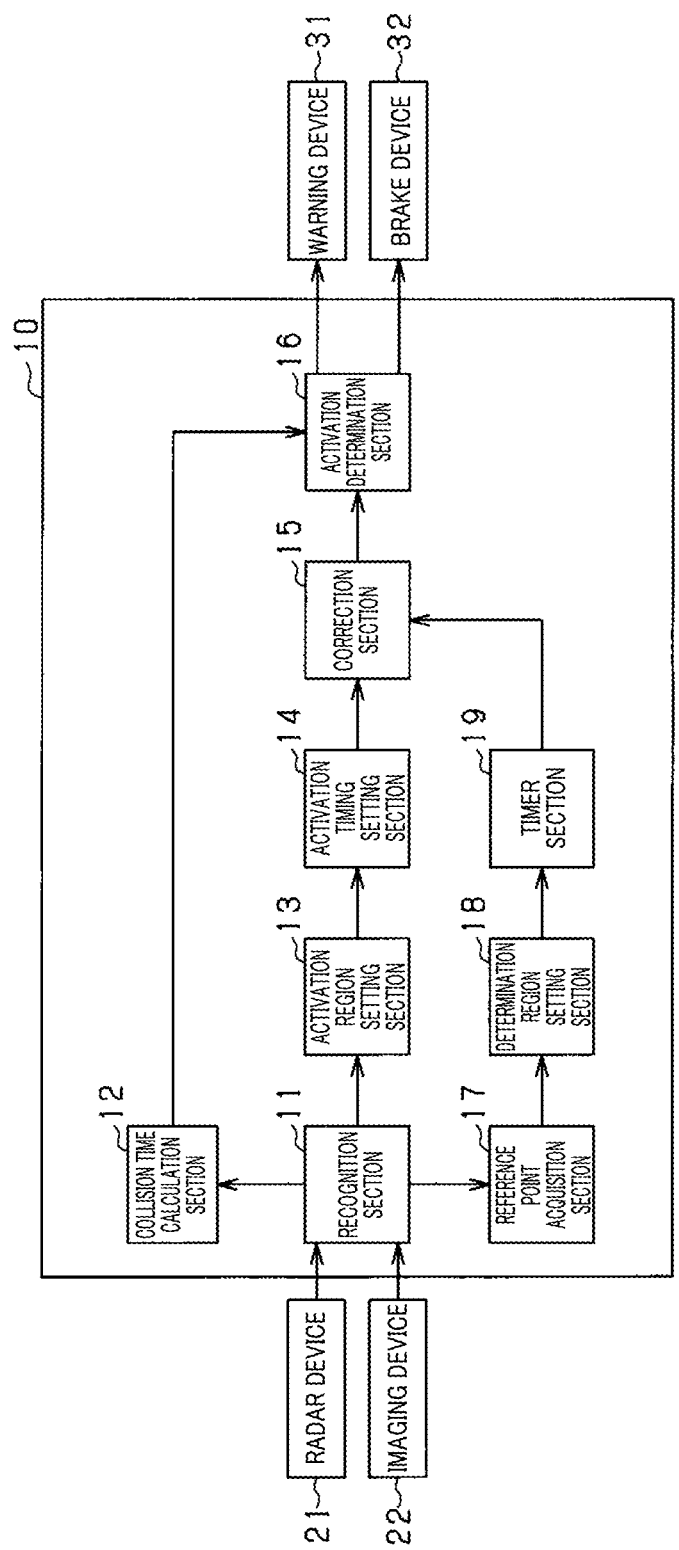
FIG. 1 is a schematic configuration diagram of a vehicle control apparatus.

Hereinafter, each embodiment will be described with reference to the drawings. Note that the same reference numerals among the embodiments described below are used to represent identical or equivalent elements in the figures, and descriptions thereof will be incorporated herein.

First Embodiment

A vehicle control apparatus according to the present embodiment is mounted in a vehicle (own vehicle), and functions as a PCS system configured to detect a target present around the own vehicle, for example, ahead of and in the travelling direction of the own vehicle, thereby performing control to avoid a collision with the target or reduce collision damage.

In FIG. 1, a vehicle control apparatus 10 is a computer including a CPU, a ROM, a RAM, an I/O, and the like. The vehicle control apparatus 10 is configured such that the CPU executes a program installed in the ROM to implement each function.

The vehicle control apparatus 10 is connected with a radar device 21 and an imaging device 22 as sensor devices acquiring various types of detection information.

For example, the radar device 21 is a known millimeter-wave radar that transmits, as a transmission wave, a high-frequency signal with a millimeter wave band, and is provided at the front end portion of the own vehicle to detect the position of a target in a detection area in which the target can be detected, the detection area being a region within a predetermined detection angle. Specifically, the radar device 21 transmits a searching wave with a predetermined period, thereby receiving a reflected wave by multiple antennas. The distance to the target is calculated based on the time at which the searching wave is transmitted and the time at which the reflected wave is received. In addition, the relative speed is calculated based on the frequency of the wave reflected by the target, the frequency having been changed by the Doppler effect. In addition, the orientation of the target is calculated based on the phase difference between the reflected waves received by the multiple antennas. Note that with the calculated position and orientation of the target, the position of the target relative to the own vehicle can be identified. Note that the radar device 21 performs, at predetermined intervals, transmission of the searching wave, reception of the reflected wave, and calculation of a reflection point and the relative speed, and then transmits the calculated reflection point and relative speed as first detection information to the vehicle control apparatus 10.

The imaging device 22 is a monocular imaging device such as a CCD camera, a CMOS image sensor, or a near-infrared camera. The imaging device 22 is attached at a predetermined height and at the center in the width direction of the vehicle, and captures an image of an area, which extends with a predetermined angle range and ahead of the vehicle, from a bird's eye view point. The imaging device 22 extracts a feature point indicating the presence of the target from the captured image. Specifically, the imaging device 22 extracts an edge point based on brightness information of the captured image, thereby performing the Hough transformation for the extracted edge portion. For example, in the Hough transformation, a point on the line of continuously-arranged multiple edge points or a point at which straight lines are orthogonal to each other is extracted as the feature point. Note that the imaging device 22 performs, at every control cycle identical to or different from that of the radar device 21, imaging and extraction of a feature point, and transmits the extraction result of the feature point as second detection information to the vehicle control apparatus 10.

The own vehicle includes, as safety devices driven by a control instruction from the vehicle control apparatus 10, a warning device 31 and a brake device 32.

The warning device 31 is a speaker or a display placed in a vehicle interior of the own vehicle. In a case where the vehicle control apparatus 10 determines that the probability of a collision of the own vehicle with an obstacle has been increased, the warning device 31 outputs, in response to the control instruction from the vehicle control apparatus 10, a warning sound, a warning message, or the like, thereby informing the driver of the risk of a collision.

The brake device 32 is a braking device that puts a brake on the own vehicle. In a case where the vehicle control apparatus 10 determines that the probability of a collision with the obstacle has been increased, the brake device 32 is activated in response to the control instruction from the vehicle control apparatus 10. Specifically, braking force for brake operation by the driver is more increased (a brake assist function), or automatic braking is performed when the driver has not performed the brake operation (an automatic brake function).

A recognition section 11 acquires the first detection information from the radar device 21 and acquires the second detection information from the imaging device 22. When a first position, which is the position acquired from the first detection information, and a second position, which is the feature point acquired from the second detection information, are in the vicinity of each other, these positions are associated with each other as positions based on the same target. In a case where the second position is present in the vicinity of the first position, there is a high probability that the target is actually present at the first position. Such a state in which the position of the target can be acquired with high accuracy by the radar device 21 and the imaging device 22 will be referred to as a fusion state. For the target determined as being in the fusion state, it is determined whether or not the target is continuously in the fusion state, with reference to a detection history. When it is determined as being continuously in the fusion state, it is determined that the target is present at the acquired position. On the other hand, when the target in the fusion state is brought into a non-detection state, the target is taken as a target present at a previous position for a predetermined period, with reference to the detection history.

For the target determined as being in the fusion state, pattern matching is performed for the second detection information by means of a pattern prepared in advance. Then, a type is associated with the target. The type of target includes an automobile, a motorcycle, a bicycle, a pedestrian, and various road structures. Note that the motorcycle and the bicycle may be collectively taken as a two-wheel vehicle.

Subsequently, the recognition section 11 associates each target with the position and speed of the target relative to the own vehicle. A lateral point indicating a relative distance in the direction orthogonal to the travelling direction of the own vehicle and a longitudinal point, which is a relative position in the travelling direction of the own vehicle, are acquired as the relative position. Then, the recognition section 11 calculates, based on the relative position and the relative speed, a lateral speed, which is a relative speed in the direction orthogonal to the travelling direction of the own vehicle, and a longitudinal speed, which is a relative speed in the travelling direction of the own vehicle.

In addition, the recognition section 11 classifies the type of target by means of the type of target, the lateral speed, and the longitudinal speed. For example, when the target is a vehicle, the target can be, by means of the own vehicle speed and the longitudinal speed, classified as a preceding vehicle present ahead of and in the travelling direction of the own vehicle and travelling in the same direction as that of the own vehicle, an oncoming vehicle present ahead of and in the travelling direction of the own vehicle and travelling in the opposite lane, or a stationary vehicle stopped ahead of and in the travelling direction of the own vehicle.

When the target is a bicycle, the target can be, by means of the own vehicle speed, the lateral speed, and the longitudinal speed, classified as a preceding bicycle present ahead of and in the travelling direction of the own vehicle and travelling in the same direction as that of the own vehicle, an oncoming bicycle present ahead of and in the travelling direction of the own vehicle and travelling in the direction opposite to that of the own vehicle, a stationary bicycle stopped ahead of and in the travelling direction of the own vehicle, or a traversing bicycle traversing the area present ahead of and in the travelling direction of the own vehicle.

In addition, the target detected only from the first detection information can be, by means of the own vehicle speed and the longitudinal speed, classified as a preceding target present ahead of and in the travelling direction of the own vehicle and moving in the same direction as that of the own vehicle, an oncoming target present ahead of and in the travelling direction of the own vehicle and moving in the direction opposite to that of the own vehicle, or a stationary target stopped ahead of and in the travelling direction of the own vehicle.

A collision time calculation section 12 calculates a time-to-collision, which is a time until the longitudinal position of the target indicating the relative distance between the own vehicle and the target reaches zero. Specifically, the collision time calculation section 12 divides the longitudinal position of the target by the longitudinal speed, which is the relative speed between the own vehicle and the target, thereby taking the obtained time as the time-to-collision. In a case where the longitudinal speed is zero or a case where the longitudinal speed is a negative value (a case where the own vehicle and the target move away from each other), the longitudinal position does not become closer, and hence, the time-to-collision is not calculated. Note that for calculation of the time-to-collision, it may be assumed that the target performs uniformly-accelerated motion relative to the own vehicle, and the time-to-collision may be calculated by means of not only the relative distance and the relative speed but also relative acceleration. In this case, even when the relative speed between the own vehicle and the target is a negative value (when the own vehicle and the target move away from each other at the time point of the calculation), if the relative acceleration is a positive value (if the relative speed changes to a positive value side), the time-to-collision is calculated.

An activation region setting section 13 sets an activation region having a predetermined width in the lateral direction orthogonal to the travelling direction of the own vehicle. This activation region is a region for determining whether or not the lateral position of the target is at such a position that the safety device needs to be activated. That is, when the lateral position of the target is in the activation region, the activation region setting section 13 determines that one condition for activating the safety device has been satisfied. Note that the width of the activation region may be different or identical among the functions to of the safety device. For example, the width of the activation region for the warning device 31 is set to be the greatest. This is because the driver notices the risk of a collision by the warning device 31 to perform the operation of avoiding the collision so that the collision can be avoided without the control instruction from the vehicle control apparatus 10 to the brake device 32.

An activation timing setting section 14 sets the activation timing (activation time) of the safety device. This activation timing is compared with the above-described time-to-collision. In a case where the position of the target is in the activation region and the time-to-collision reaches equal to or less than the activation timing, the safety device is activated. That is, setting the activation timing greater activates the safety device even in the case of a greater time-to-collision, and activates the safety device promptly.

For this activation timing, different values are set for the functions of the safety device. Specifically, the activation timing for the warning device 31 is set as the greatest value. This is because the driver notices the risk of a collision by the warning device 31 to step on a brake pedal so that the collision can be avoided without the control instruction from the vehicle control apparatus 10 to the brake device 32. Note that the activation timing for the brake device 32 is separately provided for the brake assist function and the automatic brake function. These types of activation timing may be the same value or different values.

Figure 2:
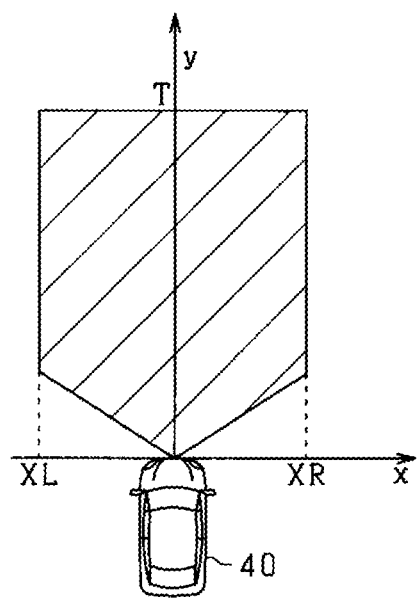
FIG. 2 is a view for illustrating an operation region and activation timing.

The activation region and the activation timing will be described with reference to FIG. 2. In FIG. 2, the travelling direction of the own vehicle 40 is indicated by the vertical axis (y-axis), and the direction orthogonal to the vertical axis is the horizontal axis (x-axis). The activation region has a predetermined width in the x-axis direction. A right width XR and a left width XL, which are respective widths of the activation region in the right and left directions, are values preset according to the type of target. The activation timing T is set in the y-axis direction, and a value obtained by multiplying the activation timing T by the relative speed (longitudinal speed) between the own vehicle and the target indicates the position. Thus, the depth of the activation region is equivalent to the value of the activation timing T. The activation timing T is also a value preset according to the type of target. Note that this activation region is provided along the shape of the road on which the own vehicle travels. That is, in a case where the own vehicle travels in a curved section of the road, both ends of the activation region are set so as to be parallel to the road shape.

The activation region set by the activation region setting section 13 and the activation timing set by the activation timing setting section 14 are corrected by a correction section 15, and then, are input to an activation determination section 16. The activation determination section 16 determines whether or not the lateral position of the target is in the activation region. If the lateral position of the target is in the activation region, it is determined that one condition for activating the safety device is satisfied. Similarly, the activation determination section 16 determines whether or not the time-to-collision is equal to or less than the activation timing. If the time-to-collision is equal to or less than the activation timing, it is determined that one condition for activating the safety device is satisfied. Then, if the activation determination section 16 determines that all the conditions for activating the safety device are satisfied, the activation determination section 16 transmits an activation instruction to the safety device, thereby making the safety device perform a corresponding function.

When the safety device is activated as described above, if the target is a bicycle and the bicycle traverses the area present ahead of the own vehicle, it is too late to activate the safety device after the bicycle has entered a range of a own vehicle width, and for this reason, the width of the activation region needs to be set to a width obtained by adding several meters to the own vehicle width. However, in a case to where the activation region is provided to further extend to several meters from the own vehicle width, there is a probability that the safety device is activated even for a bicycle which is less likely to collide with the own vehicle, such as a bicycle travelling in the direction identical to or opposite to that of the own vehicle and diagonally ahead of the own vehicle. In this case, since it is not necessary to activate the safety device, the above-described activation is unnecessary activation of the safety device. Thus, the process for reducing the unnecessary activation of the safety device is, by means of the relative speed between the own vehicle and the bicycle, performed for the bicycle positioned diagonally ahead of the own vehicle and travelling in the direction identical or opposite to that of the own vehicle. Specifically, the correction section 15 narrows the width of the activation region (narrowing process), and delays the activation timing (delaying process).

There is a case where a bicycle shows such behavior that the bicycle sways in the lateral direction during travelling, and in this case, the speed thereof in the lateral direction is detected. In this state, it cannot be determined whether the bicycle travels in the same direction as that of the own vehicle or is about to traverse the path of the own vehicle, and for this reason, non-activation or unnecessary activation of the safety device may be caused.

For these reasons, in the present embodiment, a determination region is set at a position present in the lateral direction with a predetermined distance and ahead of and in the travelling direction of the own vehicle (a position present diagonally ahead of the own vehicle) for the purpose of distinguishing between the target moving in the direction identical or opposite to that of the own vehicle and the target which is about to traverse the area present ahead of and in the travelling direction of the own vehicle. Then, in a case where the target stays in the determination region for a predetermined time or longer, it is determined that the target is moving in the direction identical or opposite to that of the own vehicle, and hence, the process for narrowing the activation region and the process for delaying the activation timing are performed to reduce unnecessary activation of the safety device.

Figure 3:
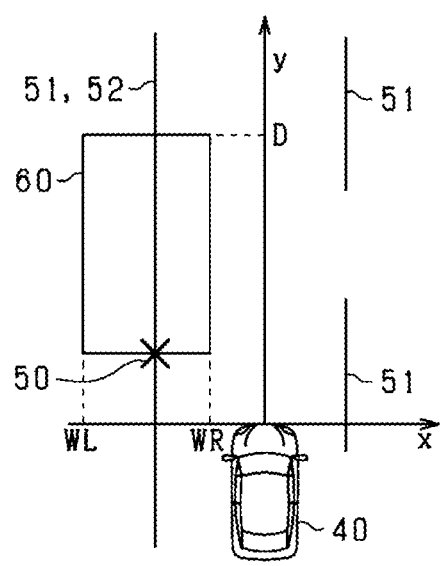
FIG. 3 is a view for illustrating a method for setting a determination region.

The method of setting the determination region will be described with reference to FIG. 3. First, a reference point acquisition section 17 sets the position relative to the own vehicle 40 as a reference point 50. The reference point 50 is set to the position of a stationary portion present ahead of and in the travelling direction of the own vehicle 40. Specifically, a division line 52 such as a white line drawn on a road is extracted as the stationary portion from the image captured by the imaging device 22, and the reference point 50 is obtained based on the division line 52. For example, for the division line 52 imaged by the imaging device 22, the lateral position of the division line 52 at a longitudinal point with a predetermined distance is taken as the reference point 50. Alternatively, multiple lateral positions of the division line 52 may be acquired, and the average of the lateral points may be taken as the reference point 50.

Subsequently, a determination region setting section 18 takes, as a reference line 51, a line extending parallel to the travelling direction of the own vehicle 40 and passing through the reference point 50, thereby setting a determination region 60 extending from the reference line 51 in the respective right and left directions.

In this state, an own-vehicle-side (inner) end portion WR of the determination region 60 is set on a straight line passing through the end portion of the own vehicle 40 in the lateral direction and extending parallel to the travelling direction of the own vehicle 40, or is set far from the straight line with respect to the own vehicle 40. This is because in a case where the inner end portion WR of the determination region 60 is positioned in the own vehicle width, the activation timing is delayed even for a target present on the path of the own vehicle 40.

On the other hand, the (outer) end portion WL of the determination region 60 opposite to the own vehicle 40 is provided on the outer end portion of a reference value of the activation region, or is provided far from the outer end portion of the activation region with respect to the own vehicle 40. When the outer end portion WL of the determination region 60 is set to a own vehicle side with respect to the outer end portion of the activation region, the target might be positioned on the outside of the determination region 60 and on the inside of the activation region. In this state, the conditions for performing the process for narrowing the activation region and the process for delaying the activation timing are not satisfied, and hence, unnecessary activation of the safety device may occur. Since the outer end portion WL of the determination region 60 is provided beyond the outer end portion of the activation region, the situation where the target is positioned on the outside of the determination region 60 and on the inside of the activation region can be prevented.

The depth D of the determination region 60 is set based on the relative speed between the own vehicle 40 and the target. In a case where the depth D is smaller than the value obtained by multiplying a reference value of the activation timing by the relative speed, there is a probability that the time-to-collision for the target present outside the determination region reaches the activation timing and the safety device is activated accordingly. Hence, a depth D is set larger as the relative speed between the own vehicle 40 and the target is greater in the approaching direction, and in this manner, the situation where the time-to-collision for the target positioned far from the determination region reaches the activation timing is prevented.

The width and depth of the determination region 60 may be set according to the type of target. As described above, a two-wheel vehicle such as a bicycle is highly likely to travel parallel to the own vehicle, in the direction identical or opposite to that of the own vehicle, and in an area present diagonally and ahead of the own vehicle and in the travelling direction thereof. On the other hand, a vehicle with four or more wheels or a pedestrian is less likely to travel parallel to the own vehicle in the direction identical or opposite to that of the own vehicle, and in an area present diagonally and ahead of the own vehicle and in the travelling direction thereof. For these reasons, a smaller determination region 60 may be set for the vehicle with four or more wheels or the pedestrian, or the vehicle with four or more wheels or the pedestrian is not necessarily targeted for the process using the determination region 60.

Figure 4A:
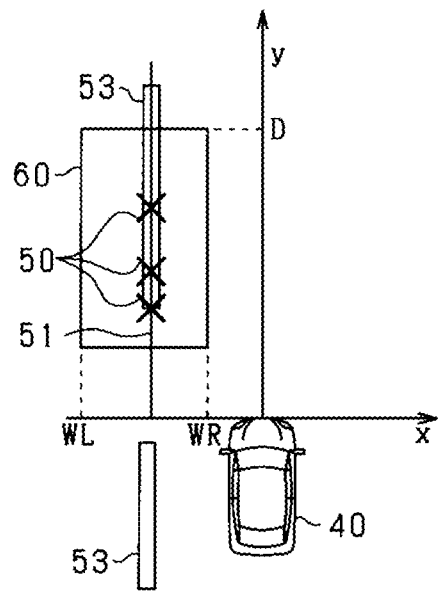
FIG. 4A is a view of another example of the method for setting the determination region.

The stationary portion used for setting the reference point 50 is not limited to the division line 52 such as the white line. FIG. 4A illustrates an example where a road structure 53 such as a guardrail or a step provided on a road is used as the stationary portion used for setting the reference point 50. The position of the road structure 53 is obtained from the first detection information acquired from the radar device 21 or the second detection information acquired from the imaging device 22.

Figure 4B:
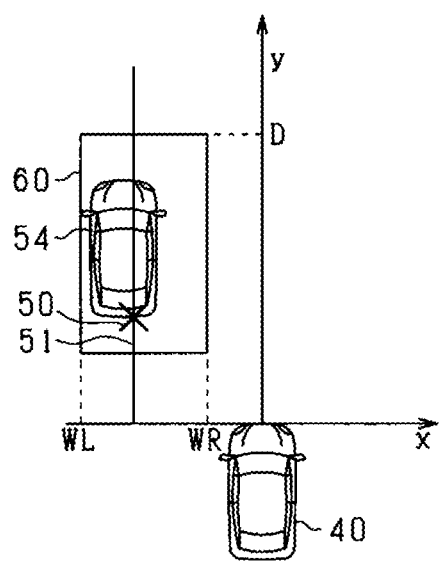
FIG. 4B is a view of another example of the method for setting the determination region.

FIG. 4B illustrates an example where another vehicle 54 stopped at the shoulder of a road is used as the stationary portion used for setting the reference point 50. In this state, the type may be determined based on the second detection information acquired from the imaging device 22, and the position based on the first detection information acquired from the radar device 21 may be taken as the reference point 50. Alternatively, both end portions of another vehicle 54 may be identified based on the second detection information acquired from the imaging device 22, and, for example, a center point between these end portions may be taken as the reference point 50. Note that by means of the relative speed between the own vehicle 40 and another vehicle 54 and the speed of the own vehicle 40, it can be determined whether or not another vehicle 54 is stopped.

Figure 5:
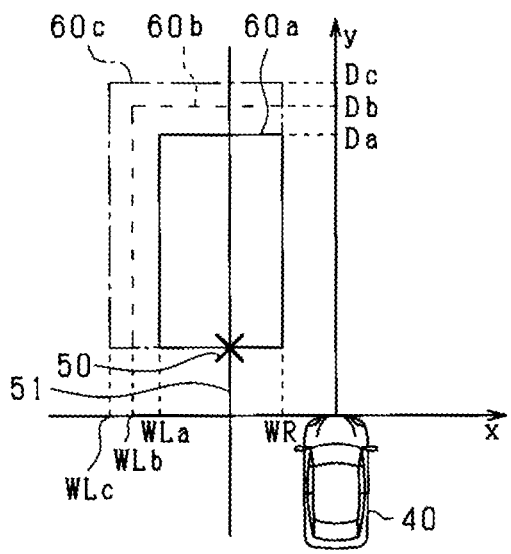
FIG. 5 is a view showing a relationship of a stay time with the operation region and the activation timing.

The determination regions 60 set based on these reference points 50 are set with widths and depths different according to the functions of the safety device. In FIG. 5, a determination region 60a for the automatic brake function is indicated by a solid line, a determination region 60b for the brake assist function is indicated by a dashed line, and a determination region 60c for a warning function is indicated by a chain line. The same inner end portion WR is set for the determination regions 60a, 60b, 60c, and outer end portions WLa, WLb, WLc of the determination regions 60a, 60b, 60c are set such that the outer end portion WLa of the determination region 60a for the warning function is closest to the own vehicle 40. Moreover, the depths Da, Db, Dc of the determination regions 60a, 60b, 60c are set such that the depth Da of the determination region 60a for the warning function is closest to the own vehicle 40. That is, the determination region 60a for the warning function is set smallest.

Greater width and depth of the determination regions 60a, 60b, 60c results in a higher likelihood that the target is positioned in the region, and as a result, the conditions for performing the process for narrowing the activation region and the process of delaying the activation timing are more likely to be satisfied. As described above, for the warning function, the activation region is set largest, and the activation timing is set greatest. Hence, unnecessary activation is more easily caused compared with the cases of other functions. On this point, the determination region 60c for the warning function is set largest so that the conditions for performing the process of narrowing the activation region and the process of delaying the activation timing can be easily satisfied and unnecessary activation can be more reduced. Note that the sizes of the determination regions 60a, 60b may be equal to each other as long as the same activation region and the same activation timing are set for the automatic brake function and the brake assist function.

Figure 6:
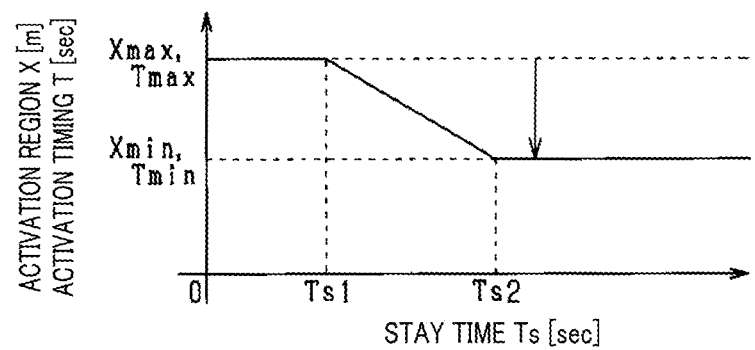
FIG. 6 is a graph for illustrating the operation region and the activation timing in a case of performing a correction process.

When the determination region is set as described above, a timer section 19 measures a stay time as a time for which the target stays in the determination region by means of the position of the target relative to the own vehicle. The correction section 15 performs, based on an increase in the stay time acquired from the timer section 19, the process (narrowing process) for narrowing the width of the activation region and the process (delaying processing) of making the activation timing a smaller value. The relationship of the stay time with the width of the activation region and the activation timing will be described with reference to FIG. 6. In FIG. 6, the horizontal axis represents the stay time Ts, and the vertical axis represents the width X (right width XR, left width XL) of the activation region and the activation timing T.

First, until the stay time Ts reaches Ts1, any of the activation region width X and the activation timing T is not corrected, and remains at Xmax or Tmax, which is a reference value (upper limit value). When the stay time Ts reaches equal to or more than Ts1, any of the activation region width X and the activation timing T gradually decreases in proportion to the stay time Ts until the stay time Ts reaches Ts2. Then, when the stay time Ts reaches equal to or more than Ts2, both the activation region width X and the activation timing T reaches Xmin and Tmin, which are the lower limit values. At this time, Xmin, which is the lower limit value of the activation region width X, is set to the own vehicle width, for example. This is because there is the risk of a collision in a case where a bicycle travelling in the direction identical or opposite to that of the own vehicle is present within the own vehicle width.

Figure 7:
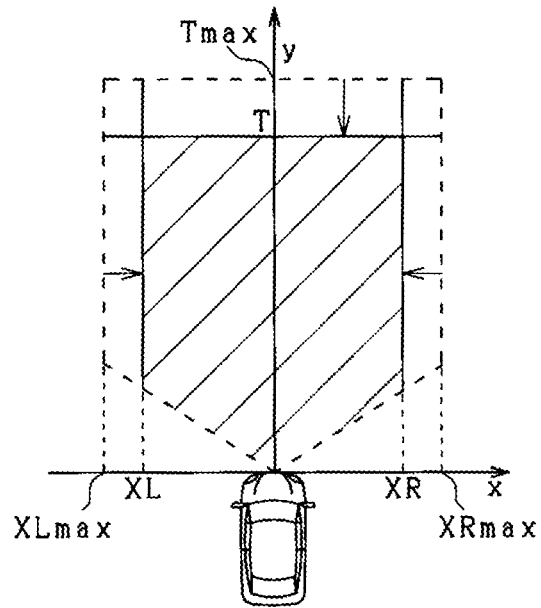
FIG. 7 is a view of an example of setting of the determination region based on a function of a safety device.

The activation region and the activation timing corrected by the correction section 15 as described above are shown in FIG. 7. By the correction process performed by the correction section 15, the width X (right width XR, left width XL) of the activation region is set to a value smaller than the reference value (right upper limit value XRmax, left upper limit value XLmax), and the activation timing T reaches a value smaller than Tmax, which is the upper value. That is, the position of the target is less likely to be in the activation region, and the safety device is activated in a case where the time-to-collision reaches a smaller value.

Figure 8:
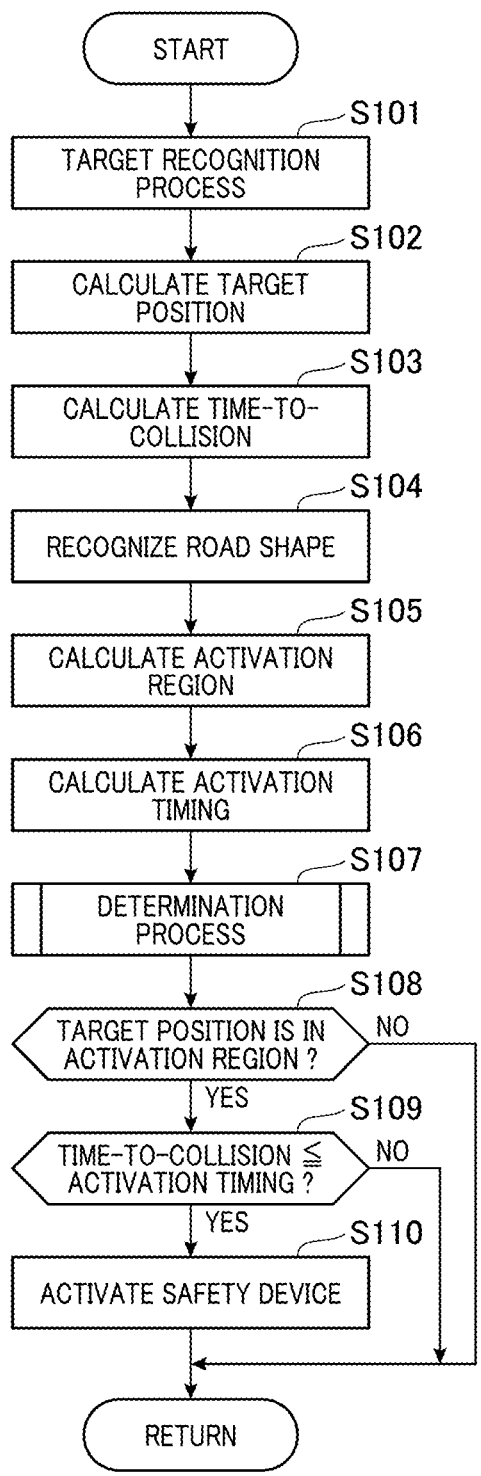
FIG. 8 is a flowchart of a series of processes performed by the vehicle control apparatus.

A series of processes performed by the vehicle control apparatus 10 according to the present embodiment will be described with reference to the flowchart in FIG. 8. The flowchart shown in FIG. 8 is repeatedly executed at every predetermined control cycle.

First, the recognition section 11 acquires the detection information from the radar device 21 and the imaging device 22, and then, performs the process of recognizing the target (S101) to calculate the position of the target (S102). Then, the collision time calculation section 12 calculates the time-to-collision based on the above-described position and the speed of the target relative to the own vehicle (S103). Subsequently, the recognition section 11 recognizes a road shape (S104). The activation region setting section 13 calculates the activation region based on the road shape (S105), and the activation timing setting section 14 calculates the activation timing (S106). With the calculated activation region and activation timing, the determination process using the determination region shown in FIGS. 3 to 5 is performed for determining whether or not the calculated activation region and activation timing need to be corrected (S107).

After the determination process, the activation determination section 16 determines whether or not the position of the target is in the activation region (S108). In a case where the position of the target is in the activation region (S108: YES), one condition for activating the safety device is satisfied. Hence, the activation determination section 16 subsequently determines whether or not the time-to-collision has reached equal to or less than the activation timing (S109). If the time-to-collision is equal to or less than the activation timing (S109: YES), all the conditions for activating the safety device are satisfied. Hence, the activation determination section 16 activates the safety device (S110) to end the series of processes. On the other hand, in a case where the position of the target is not in the activation region (S108: NO) or a case where the time-to-collision is not equal to or less than the activation timing (S109: NO), at least one of the conditions for activating the safety device is not satisfied. Hence, the series of processes ends without activation of the safety device.

Figure 9:
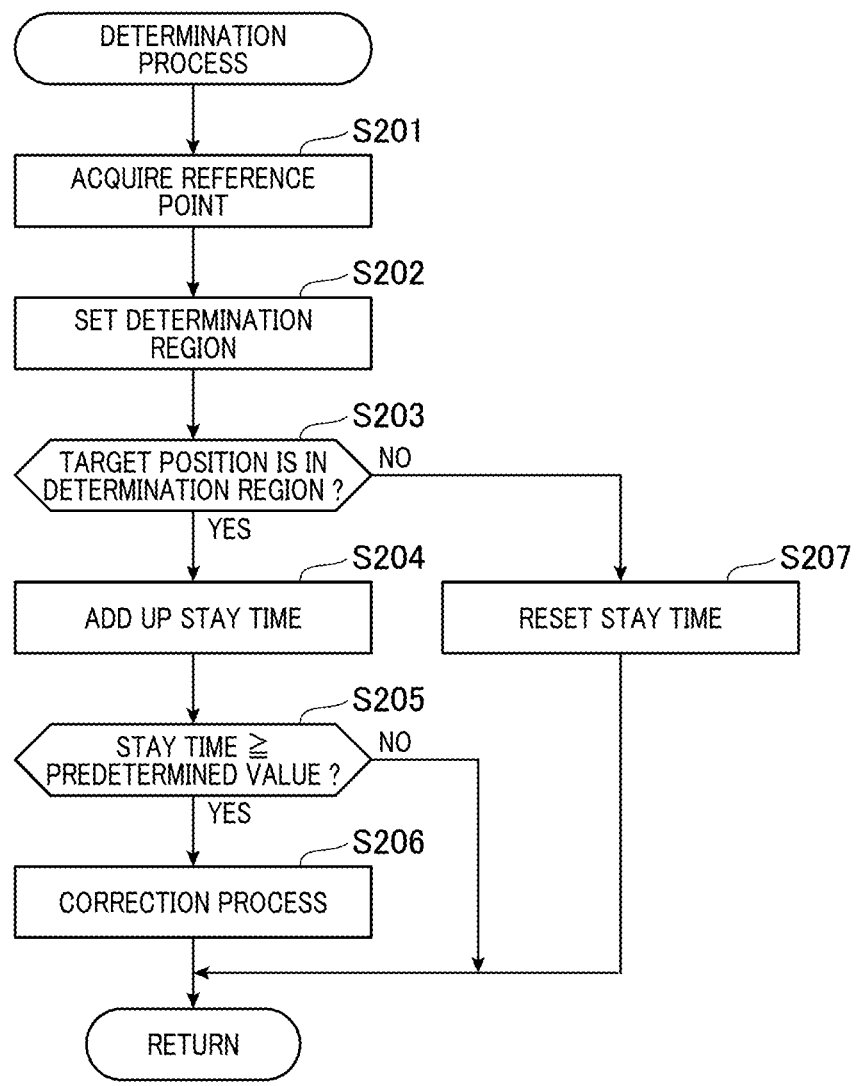
FIG. 9 shows a subroutine of a determination process using the determination region.

FIG. 9 shows a subroutine of the determination process in S107. First, the reference point acquisition section 17 acquires the reference point based on the stationary portion such as a division line drawn on a road (S201), and the determination region setting section 18 sets the determination region taking, as the reference line, the line passing through the reference point and extending parallel to the travelling direction of the own vehicle (S202). The determination region setting section 18 uses the set determination region and the position of the target to determine whether or not the position of the target is in the determination region (S203). If the position of the target is in the determination region (S203: YES), the timer section 19 adds up the stay time (S204), and the correction section 15 determines whether or not the stay time is a value equal to or more than a predetermined value (S205). If the stay time is equal to or more than the predetermined value (S205: YES), the correction section 15 corrects the activation region and the activation timing based on the stay time (S206), and ends the process of the subroutine. On the other hand, if the stay time is shorter than the predetermined value (S205: NO), the processing of the subroutine ends without performing the correction process. If the position of the target is outside the determination region (S203: NO), the timer section 19 resets the stay time (S207), and the processing of the subroutine ends without performing the correction process.

With the above-described configuration, the vehicle control apparatus 10 according to the present embodiment provides the following advantageous effects.

A longer time for which the target stays diagonally ahead of the own vehicle and in the travelling direction thereof results in a higher probability that the target is travelling in the direction identical or opposite to that of the own vehicle. It can be said that the probability that the target traverses the area present ahead of the own vehicle and in the travelling direction thereof is low. In the above-described configuration, the time for which the target stays in the determination region provided diagonally ahead of the own vehicle and in the travelling direction thereof is measured, and the correction process, which is at least one of the process for delaying the activation timing and the process for narrowing the activation region is performed for a longer time for which the target stays in the determination region. In this manner, unnecessary activation of the safety device for the target having a lower probability that the target traverses the area present ahead of and in the travelling direction of the own vehicle can be reduced.

For the target travelling in the direction identical or opposite to that of the own vehicle, the probability that the driver recognizes the presence of the target is high, and the probability that the driver performs collision avoidance operation is high. On this point, for the target travelling in the direction identical or opposite to that of the own vehicle, the safety device is less likely to be activated due to the correction process. Hence, the situation where unnecessary activation of the safety device is performed for the target whose presence is recognized by the driver can be prevented.

The inner end portion of the determination region is set so as to be far from the side of the own vehicle. Hence, the performance of the process for setting the width of the activation region and the time-to-collision to smaller values can be prevented for the target positioned on the path of the own vehicle. Thus, non-activation of the safety device can be prevented.

Since the outer end portion of the determination region is set to the outside of the activation region, the situation where the target positioned far from the determination region and travelling in the direction identical or opposite to that of the own vehicle is positioned in the activation region can be prevented. Thus, unnecessary activation of the safety device can be prevented.

Second Embodiment

In the present embodiment, part of the process performed by the determination region setting section 18 of the vehicle control apparatus 10 and part of the process performed by the correction section 15 are different from those of the first embodiment.

Figure 10:
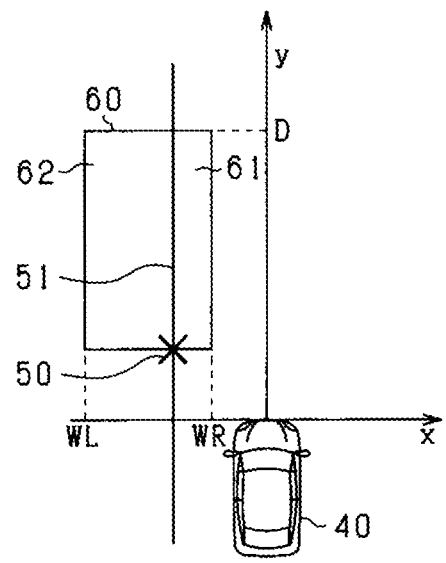
FIG. 10 is a view showing a determination region in a second embodiment.

A determination region set by the determination region setting section 18 is shown in FIG. 10. The determination region 60 is divided into a near region 61, which is an own-vehicle-side region with respect to a straight line (reference line 51) passing through the reference point 50 and extending parallel to the path of the own vehicle 40, and a far region 62, which is a further region with respect to the reference line 51 passing through the reference point 50. As in the first embodiment, the reference point 50 is acquired based on a stationary portion such as a division line drawn on a road. Thus, it can be said that a target positioned in the near region 61 is moving in the direction identical or opposite to that of the own vehicle 40 in a lane in which the own vehicle 40 travels, and that a target positioned in the far region 62 is travelling in the direction identical or opposite to that of the own vehicle 40 and outside the lane in which the own vehicle 40 travels. That is, it can be said that the probability that the target positioned in the far region 62 collides with the own vehicle 40 is lower.

Thus, the correction section 15 changes the amount of correction in the correction process depending on whether the target is present in the near region 61 or the far region 62. Specifically, when the stay time reaches equal to or more than a predetermined value and the process for gradually decreasing the width of the activation region and the activation timing is performed, if the target is positioned in the far region 62, the amount of decrease per unit time is increased. Note that the correction process performed in a case where the target is positioned in the near region 61 is referred to as a first correction process, and the correction process performed in a case where the target is positioned in the far region 62 is referred to as a second correction process.

Figure 11:
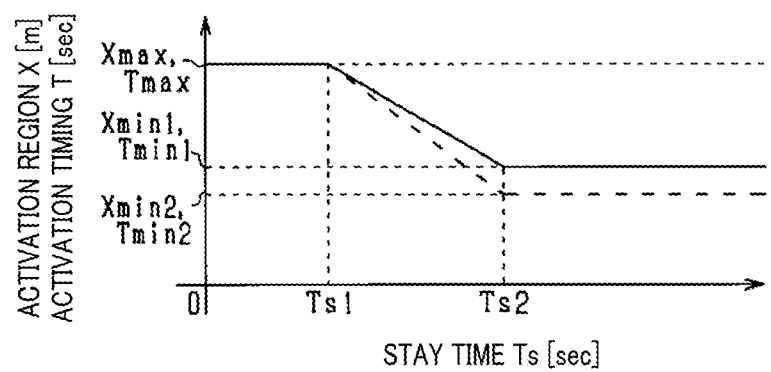
FIG. 11 is a graph showing a relationship of a stay time with an operation region and activation timing in the second embodiment.

FIG. 11 shows a relationship of the stay time Ts with the activation region width X and the activation timing T. The first correction process performed in a case where the target is positioned in the near region 61 on the inside (own vehicle side) of the reference point 50 is indicated by a solid line, and the second correction process performed in a case where the target is positioned in the far region 62 on the outside of the reference point 50 is indicated by a dashed line. The same Ts1, which is time of the start of the gradual decrease, and the same Ts2, which is time of the end of the gradual decrease, are provided to the first correction process and the second correction process. In the second correction process, since the amount of correction per unit time is set larger, Xmin2 and Tmin2, which are lower limit values of the activation region width X and the activation timing T, are smaller than Xmin1 and Tmin1, which are lower limit values in the first correction process. By performing the correction process as described above, unnecessary activation of the safety device can be further prevented in a case where the target is present in the far region 62.

Figure 12:
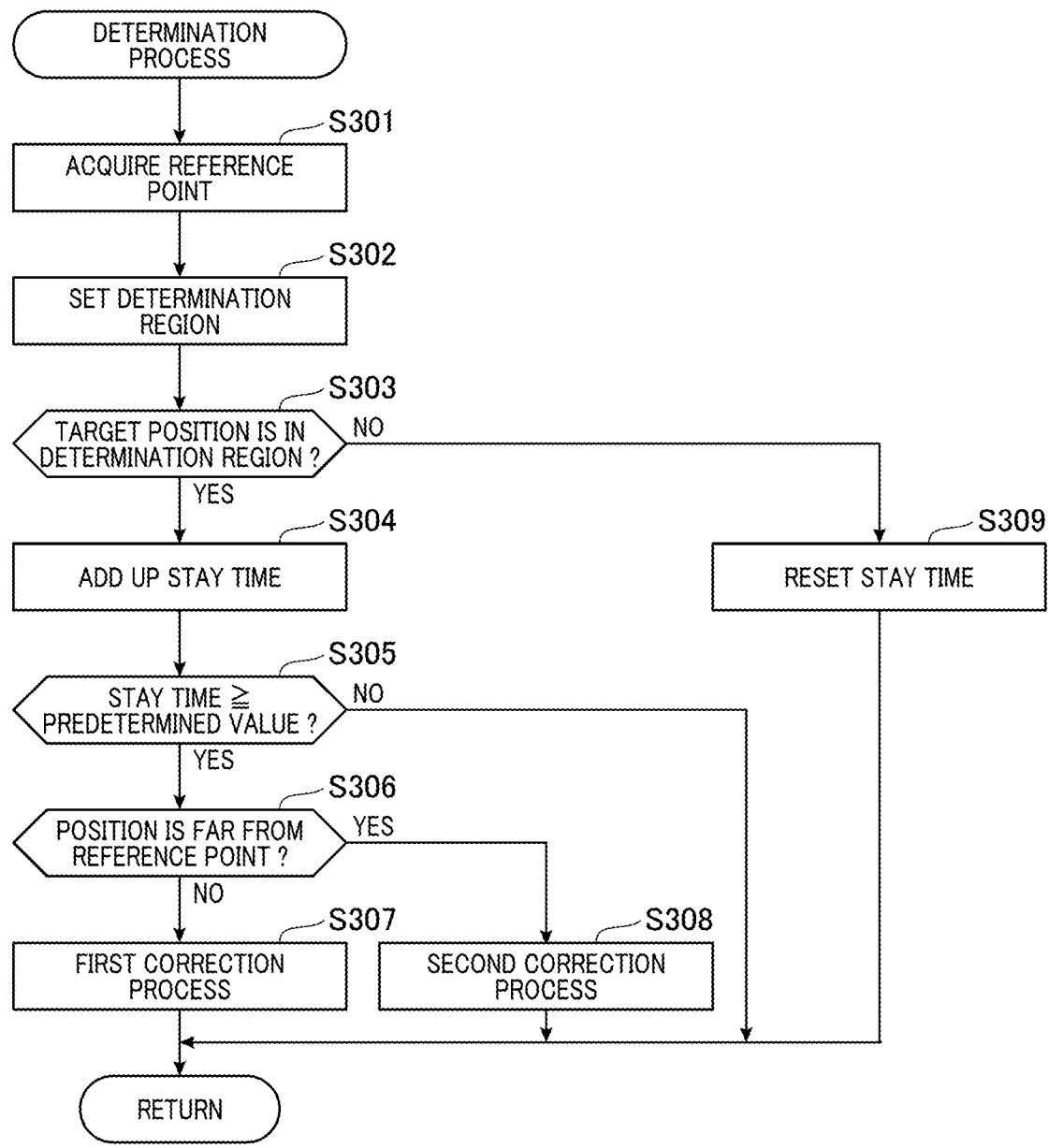
FIG. 12 shows a subroutine of a determination process in the second embodiment.

FIG. 12 shows a subroutine of the determination process using the determination region. First, the reference point acquisition section 17 acquires the reference point based on, for example, the division line drawn on the road (S301), and the determination region setting section 18 sets the determination region taking, as the reference line, the line passing through the reference point and extending parallel to the travelling direction of the own vehicle (S302). The determination region setting section 18 uses the set determination region and the position of the target to determine whether or not the position of the target is in the determination region (S303). If the position of the target is in the determination region (S303: YES), the timer section 19 adds up the stay time (S304), and the correction section 15 determines whether or not the stay time is a value equal to or more than a predetermined value (S305). If the stay time is equal to or more than the predetermined value (S305: YES), the correction section 15 determines whether the position of the target is on the own vehicle side or the far side with respect to the reference point (S306).

If the position of the target is not on the far side with respect to the reference point (S306: NO), the correction section 15 performs the first correction process for the activation region and the activation timing based on the stay time (S307) and ends the processing of the subroutine. On the other hand, if the position of the target is on the far side with respect to the reference point (S306: YES), the correction section 15 performs the second correction process for the activation region and the activation timing based on the stay time (S308), and ends the series of processes. If the stay time is shorter than the predetermined value (S305: NO), the correction section 15 ends the processing of the subroutine without performing the correction process. Note that if the position of the target is outside the determination region (S303: NO), the timer section 19 resets the stay time (S309), and the correction section 15 ends the processing of the subroutine without performing the correction process.

In a case where the target is present on the outside of the reference point, change may be made as shown in any of FIGS. 13A to 13D. Alternatively, the process shown in FIG. 11 and the modifications shown in FIGS. 13A to 13D may be appropriately combined with each other. Note that in FIGS. 13A to 13D, the first correction process performed in a case where the target is positioned in the near region 61 on the inside (own vehicle side) of the reference point is, as in FIG. 11, indicated by a solid line, and the second correction process performed in a case where the target is positioned in the far region 62 on the outside of the reference point is indicated by a dashed line.

Figure 13A:
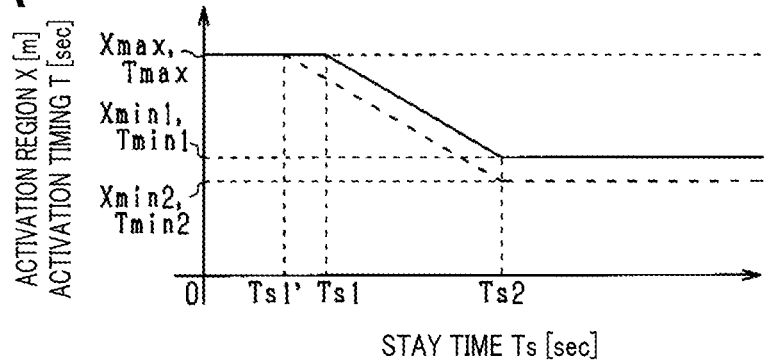
FIG. 13A is a graph showing another example of the relationship of the stay time with the operation region and the activation timing.

As shown in FIG. 13A, the correction may start at Ts1', which is the time earlier than Ts1, for the purpose of starting the second correction process at earlier time. In this case, when the times at which the activation region width X and the activation timing T reach the respective lower limit values are set equal to each other, Xmin2 and Tmin2, which are the lower limit values in the second correction process, are values smaller than Xmin1 and Tmin1, which are the lower limit values in the first correction process.

Figure 13B:
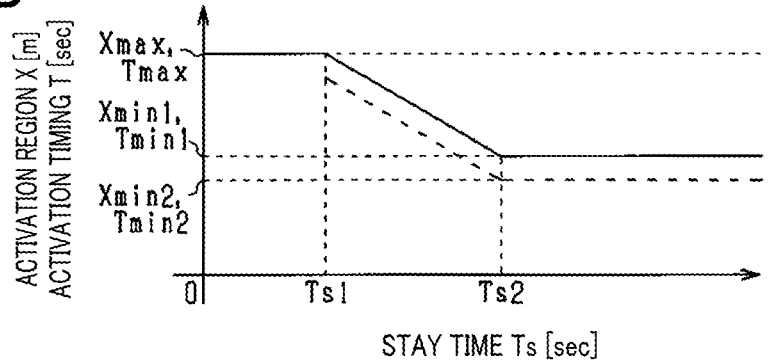
FIG. 13B is a graph showing another example of the relationship of the stay time with the operation region and the activation timing.

As shown in FIG. 13B, the gradual decrease process may be, in any of the first correction process and the second correction process, performed on condition that the stay time exceeds Ts1 while each of the activation region width X and the activation timing T is subjected to subtraction of a predetermined value in the second correction processing. In this case, when the times at which the activation region width X and the activation timing T reach the respective lower limit values are set equal to each other, Xmin2 and Tmin2, which are the lower limit values in the second correction process, are values smaller than Xmin1 and Tmin1, which are the lower limit values in the first correction process.

Figure 13C:
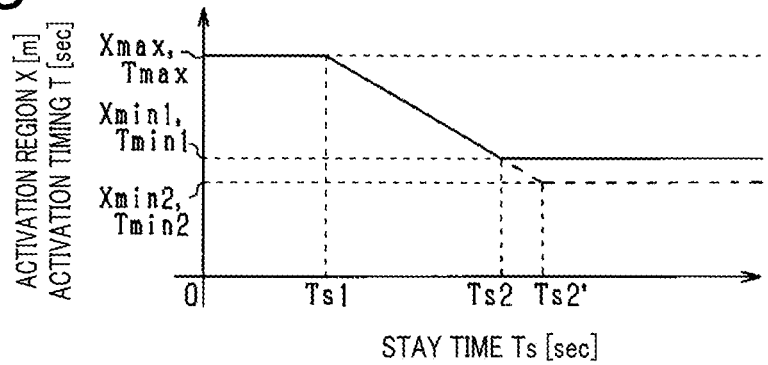
FIG. 13C is a graph showing another example of the relationship of the stay time with the operation region and the activation timing.

As shown in FIG. 13C, the stay times Ts at which the first correction process and the second correction process start may be set equal to each other, proportionality coefficients may be set equal to each other, and Xmin2 and Tmin2, which are the lower limit values in the second correction process, may be values smaller than Xmin1 and Tmin1, which are the lower limit values in the first correction process. In this case, at Ts2, which is the time later than Ts2 at which the gradual decrease process in the first correction process ends and the activation region width X and the activation timing T reach the lower limit values, the gradual decrease process in the second correction process ends, and the activation region width X and the activation timing T reach the lower limit values.

Figure 13D:
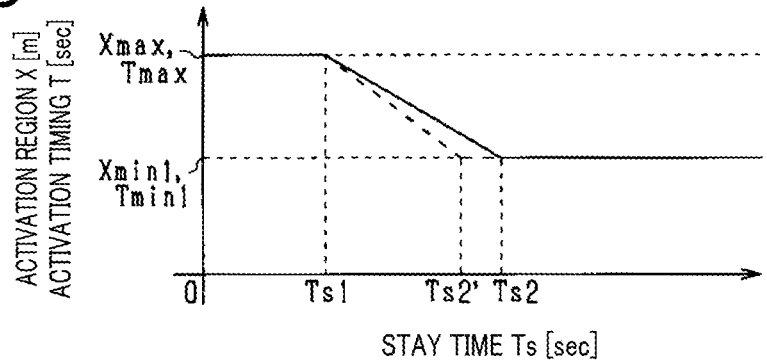
FIG. 13D is a graph showing another example of the relationship of the stay time with the operation region and the activation timing.

As shown in FIG. 13D, the stay times at which the first correction process and the second correction process start may be set equal to each other, the lower limit values may be set equal to each other, and the proportionality coefficients in the gradual decrease processes may be set different from each other. In this case, the activation region width X and the activation timing T reach Xmin and Tmin, which are the lower limit values, at earlier time by the second correction process.

With the above-described configuration, the vehicle control apparatus 10 according to the present embodiment provides the following advantageous effects in addition to the advantageous effects provided by the vehicle control apparatus 10 according to the first embodiment.

In the case of acquiring the reference point based on a white line, a target having a long stay time and positioned further with respect to the reference point means that the target travels in parallel with the own vehicle and on the outside of the lane of the own vehicle. Similarly, in the case of acquiring the reference point based on a road structure such as a guardrail, a target having a long stay time and positioned further with respect to the reference point means that the target travels in parallel with the own vehicle on, for example, a sidewalk at the side of a road. Thus, the probability of a collision of the own vehicle with the target is lower than that in the case where the target is positioned on the own vehicle side with respect to the reference point. In the present embodiment, in the case where the target is present further with respect to the reference point, a regulation value is set lower, and the activation timing is further delayed. Thus, unnecessary activation of the safety device for a target having a lower probability of a collision with the own vehicle can be further prevented.

Third Embodiment

In a case where a reference point is acquired based on a white line, a road structure, etc., the reference point may not be temporarily acquired due to, for example, wearing or discontinuity of the white line or discontinuity of the road structure. In this case, if a determination region is deleted, accordingly, the measurement of a stay time also ends. Hence, there is a probability that unnecessary activation of the safety device is performed for a bicycle etc. travelling in the direction identical or opposite to that of the own vehicle and diagonally ahead of the own vehicle. Thus, in the present embodiment, until a predetermined time elapses since the reference point can be no longer acquired, a relative position relationship between the determination region and the own vehicle is maintained while the determination region is held.

Note that in a case where the own vehicle is not travelling straight ahead, such as a case where the own vehicle is travelling in a curved road section of a road or is making a lane change, if the determination region is held, a target positioned on the path of the own vehicle may be present in the determination region, or a target that is about to traverse the path of the own vehicle may be present in the determination region for a predetermined time or longer. For this reason, holding the determination region ends on condition that it is detected that the own vehicle is not travelling straight ahead. In this case, the determination whether or not the own vehicle is travelling straight ahead may be made on condition that a steering angle of the steering device of the own vehicle exceeds a predetermined value or on condition that acceleration in the lateral direction exceeds a predetermined value.

Figure 14:
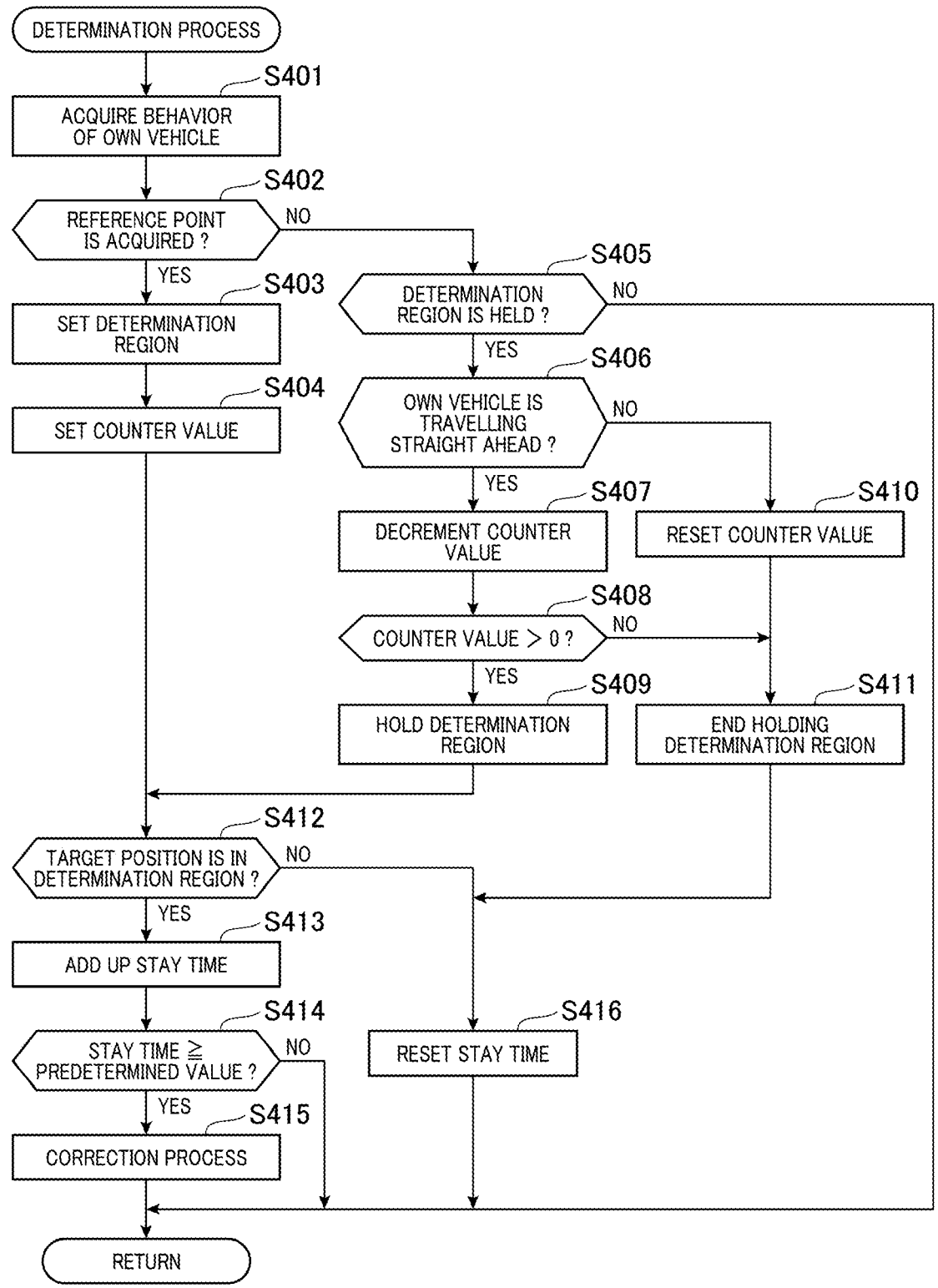
FIG. 14 shows a subroutine of a determination process in a third embodiment.

A series of processes performed by the vehicle control apparatus 10 according to the present embodiment is similar to that shown in FIG. 8 of the first embodiment, and is different in the subroutine process of S107. FIG. 14 shows a subroutine of the determination process of S107 in FIG. 8.

First, the reference point acquisition section 17 acquires behavior of the own vehicle (S401), and determines whether or not the reference point has been acquired (S402). If the reference point has been acquired (S402: YES), the determination region setting section 18 sets the determination region based on the reference point (S403), and set a counter value to the maximum value (S404).

On the other hand, if the reference point has not been acquired (S402: NO), the determination region setting section 18 determines whether or not the counter value is not zero and the determination region is being held (S405). If the determination region is being held (S405: YES), the determination region setting section 18 determines whether or not the own vehicle is travelling straight ahead (S406). If the own vehicle is travelling straight ahead (S406: YES), the determination region setting section 18 decrements the counter value (S407), and then, determines whether or not the decremented counter value is a value more than zero (S408). If the decremented counter value is a value more than zero (S408: YES), it is in a period during which the determination region is held. Hence, the determination region setting section 18 maintains the position relative to the own vehicle while holding the determination region (S409). On the other hand, in the case where the decremented counter value is zero (S408: NO), it means that the period during which the determination region is held has ended. Hence, the determination region setting section 18 ends holding the determination region (S411). In the case where the own vehicle is not travelling straight ahead (S406: NO), the determination region setting section 18 resets the counter value to zero (S410), and ends holding the determination region (S411).

In the case where the determination region is set (S403) or the case where the determination region is held (S409), the determination region setting section 18 determines whether or not the position of the target is in the determination region (S412). If the position of the target is in the determination region (S412: YES), the timer section 19 adds up the stay time (S413), and the correction section 15 determines whether or not the stay time is a value equal to or more than a predetermined value (S414). If the stay time is equal to or more than the predetermined value (S414: YES), the correction section 15 corrects the activation region and the activation timing based on the stay time (S415), and ends the process of the subroutine. On the other hand, if the stay time is shorter than the predetermined value (S414: NO), the correction section 15 ends the process of the subroutine without performing the correction process. In the case where holding the determination region ends (S411) or the case where the position of the target is outside the determination region (S412: NO), the timer section 19 resets the stay time (S416), and the correction section 15 ends the process of the subroutine without performing the correction process.

Figure 15:
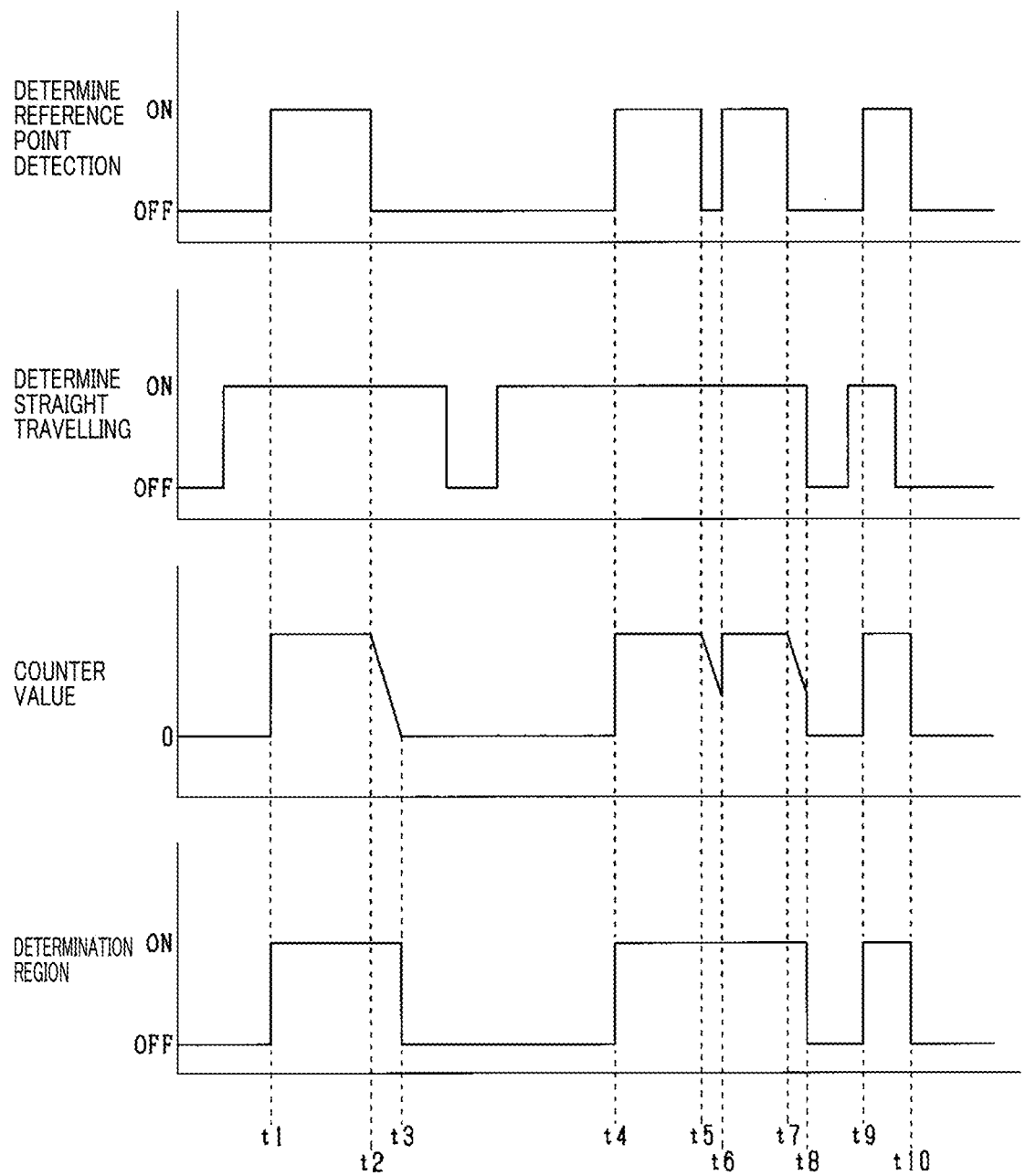
FIG. 15 is a time chart when the determination process is performed in the third embodiment.

Subsequently, the state of holding the determination region in a case where the process of the subroutine shown in FIG. 14 is repeatedly performed will be described with reference to a time chart in FIG. 15.

First, when detecting the reference point starts at time t1, the counter value is set to an initial value, and the determination region is set based on the detected reference point. When the reference point can be no longer detected at subsequent time t2, the counter value is decremented until a time point t3 at which the counter value reaches zero. At this time, before the time point t3 at which the counter value is more than zero, it is determined that the own vehicle is travelling straight ahead. Hence, the determination region is held.

When detecting the reference point is restarted at time t4, the counter value is set to the initial value, and the determination region is set based on the detected reference point. When the reference point can be no longer detected at time t5, the own vehicle is travelling straight ahead. Thus, the counter value is decremented, and the determination region is held. When detecting the reference point is restarted at subsequent time t6, the counter value is set to the initial value. That is, since the counter value is not zero during a period from time t5 to time t6, that is, a period during which detection of the reference point is unavailable, holding the determination region is continued.

When the reference point can be no longer detected at time t7, the own vehicle is travelling straight ahead. Thus, the counter value is decremented, and the determination region is held. At subsequent time t8, if it is determined that the own vehicle is not travelling straight ahead, for example, that the own vehicle is travelling on a curved section of the road, the counter value is reset to zero, and holding the determination region ends.

When detecting the reference point is restarted at time t9, the counter value is set to the initial value, and the determination region is set based on the detected reference point. When the reference point can be no longer detected at subsequent time t10, it is, at this time, determined that the own vehicle is not travelling straight ahead. Thus, the counter value is reset to zero, and holding the determination region ends.

With the above-described configuration, the vehicle control apparatus 10 according to the present embodiment provides the following advantageous effects in addition to the advantageous effects provided by the vehicle control apparatus 10 according to the first embodiment.

In a case where the reference point is acquired by detecting the white line, the reference point may not be temporarily acquired due to, for example, wearing of the white line. In a case where the reference point is acquired by detecting a road structure such as a guardrail, the reference point may not be temporarily acquired due to discontinuity of the guardrail. In the present embodiment, in the case where the reference point can be no longer acquired, the determination region is held until predetermined time elapses. Hence, the determination whether or not the target is travelling in the direction identical or opposite to that of the own vehicle does not end unexpectedly. Thus, unnecessary activation of the safety device can be prevented.

In the case where the reference point can be no longer acquired, when the process for holding the determination region is performed, if the own vehicle is turning, the target positioned on the path of the own vehicle may be present in the determination region, or the target which is about to traverse the path of the own vehicle may be present in the determination region for a predetermined time or longer. In the present embodiment, in the case where the reference point has not been acquired and the own vehicle is not travelling straight ahead (the own vehicle is turning), the process for holding the determination region has ended. Hence, non-activation and unnecessary activation of the safety device can be prevented.

Fourth Embodiment

In a case where the driver recognizes the presence of a target and performs operation to avoid a collision with the target, if the safety device is activated in addition to such avoidance operation or against such avoidance operation, the activation of the safety device is against the driver's intention, that is, unnecessary activation. For this reason, in the present embodiment, the correction section 15 determines whether or not the operation of avoiding a collision with the target has been performed by the driver. If such operation has been performed, the process for correcting the activation region width and the activation timing is not performed.

A series of processes performed by the vehicle control apparatus 10 according to the present embodiment is similar to that shown in FIG. 8 of the first embodiment, and is different in the processing of the subroutine of S107. FIG. 16 shows a subroutine of the determination process of S107 in FIG. 8.

First, the reference point acquisition section 17 acquires the reference point based on the stationary portion such as a division line drawn on a road (S501). The determination region setting section 18 sets the determination region taking, as the reference line, the line passing through the reference point and extending parallel to the travelling direction of the own vehicle (S502). The determination region setting section 18 uses the set determination region and the position of the target to determine whether or not the position of the target is in the determination region (S503). If the position of the target is in the determination region (S503: YES), the timer section 19 adds up the stay time (S504), and the correction section 15 determines whether or not the stay time is a value equal to or more than a predetermined value (S505).

If the stay time is equal to or more than the predetermined value (S505: YES), the correction section 15 subsequently determines whether or not the operation of avoiding a collision has been performed by the driver of the own vehicle (S506). If the avoidance operation has not been performed by the driver (S506: NO), the activation region and the activation timing are corrected based on the stay time (S507), and the processing of the subroutine ends. On the other hand, in a case where the stay time is shorter than the predetermined value (S505: NO) and the avoidance operation has been performed by the driver (S506: YES), the correction section 15 ends the processing of the subroutine without performing the correction process. If the position of the target is outside the determination region (S503: NO), the timer section 19 resets the stay time (S508), and the correction section 15 ends the processing of the subroutine without performing the correction process.

Note that in the case where the avoidance operation has been performed by the driver, the correction process may not be performed, and the stay time may be reset. In the case where the avoidance operation has been performed by the driver, if the safety device is activated, the driver feels a burden of such activation. Hence, in a case where the avoidance operation has been performed by the driver, the activation process of S110 shown in FIG. 8 is not performed.

With the above-described configuration, the vehicle control apparatus 10 according to the present embodiment can reduce activation of the safety device against driver's intention to perform the collision avoidance operation.

Fifth Embodiment

In the first to fourth embodiments, the reference point is acquired based on the position of the stationary portion such as a white line or a road structure, and the determination region is set based on the reference point. On this point, in the present embodiment, a determination region is set by means of a preset position relative to the own vehicle regardless of the position of a stationary portion.

The determination region is provided at a position that is present ahead of and in the travelling direction of the own vehicle and that is apart from the center of the own vehicle in the lateral direction with a predetermined distance. That is, the determination region is provided at a position that is present in the travelling direction of the own vehicle and diagonally ahead thereof. In this state, as in the first embodiment, the inner end portion of the determination region is set along the side of the own vehicle, and the outer end portion of the determination region is provided along the end portion of the reference value of the activation region or far from the end portion of the activation region. Since the determination process using the determination region is equivalent to that of each of the above-described embodiments, a specific description thereof will be omitted.

Note that a reference point may be set in advance at the position relative to the own vehicle, and a region extending rightward and leftward from the reference point and in the lateral direction may be taken as the determination region.

The method for setting the determination region according to the present embodiment may be used in combination with the first to fourth embodiments. That is, the determination region may be set based on the reference point in a case where the reference point has been acquired, and may be set by the process according to the present embodiment in a case where the reference point can be no longer acquired or a case where a predetermined time has elapsed since the reference point can be no longer acquired.

As described in the third embodiment, in a case where the own vehicle is travelling in a curved section of the road or is making a lane change, the target positioned on the path of the own vehicle may be present in the determination region, or the target which is about to traverse the path of the own vehicle may be present in the determination region for a predetermined time or longer. Hence, setting of the determination region according to the present embodiment may be limited to a case where the own vehicle is travelling straight ahead.

With the above-described configuration, the vehicle control apparatus 10 according to the present embodiment provides the following advantageous effects in addition to the advantageous effects equivalent to the advantageous effects provided by the vehicle control apparatus 10 according to the first embodiment.

In a case where the reference point is acquired based on the stationary portion such as a division line, a road structure, or a stopped vehicle, if the reference point cannot be acquired, the determination region cannot be set. On this point, in the present embodiment, even in a case where the position of the stationary portion cannot be acquired, movement of the target positioned ahead of and in the travelling direction of the own vehicle can be estimated by using the determination region. Moreover, a processing load of the vehicle control apparatus 10 in setting of the reference point can be reduced.

Variations

In the embodiments, the activation region and the activation timing are both corrected according to the stay time of the target in the determination region. However, one of the activation region and the activation timing may be corrected. Also in this case, the effect of preventing unnecessary activation of the safety device can be provided.

In the embodiments, the determination regions having different widths and depths according to the functions of the safety device are set. However, the determination regions may have the same width and depth.

In the embodiments, the widths of the activation region in the right and left directions are narrowed depending on the increase in the stay time in the determination region. However, the process for narrowing the activation region may be performed only for the side provided with the determination region.

In the embodiments, the stay time is reset on condition that the position of the target is outside the determination region. However, even in a case where the position of the target is outside the activation region, the process for holding the stay time for a predetermined time or the process for gradually decreasing the stay time may be performed without promptly resetting the stay time. With this configuration, in a case where a two-wheel vehicle travelling in the same direction as that of the own vehicle has temporarily moved to the outside of the determination region, unnecessary activation of the safety device can be prevented without promptly ending the process for correcting the activation region and the activation timing.

In the embodiments, a longer stay time of the target in the determination region results in a greater gradual decrease in the width of the activation region and the activation timing. However, the width of the activation region and the activation timing may be changed in a binary manner on condition that the stay time reaches equal to or more than a predetermined value.

In the embodiments, in a case where the stay time reaches the predetermined value, corrections of both of the width of the activation region and the activation timing start. On this point, the correction of one of the width of the activation region and the activation timing may start in the case where the stay time reaches the predetermined value, and the correction of the other of the width of the activation region and the activation timing may start in a case where the stay time reaches a value larger than the predetermined value. The same applies to a case where the width of the activation region and the activation timing are changed in a binary manner. Moreover, the stay times at which the width of the activation region and the activation timing reach the lower limit values may not be equal to each other.

In the third embodiment, holding the determination region ends in the case where the own vehicle is not travelling straight ahead. However, the determination region may be held while the stay time is reset and is not measured. In this case, when the detection of the reference point is possible, the determination region is reset based on the reference point, and the measurement of the stay time starts.

In the embodiments, the determination region has a width and a depth, and it is determined whether or not the target is positioned in the determination region by means of the width and the depth. On this point, the determination region may have only a width, and it may be determined whether or not the lateral position of the target is in the width. In this case, it may be determined whether or not the lateral position of the target is within a predetermined area including the reference point.

In the embodiments, the driver drives the vehicle in which the vehicle control apparatus 10 is mounted. However, the vehicle control apparatus 10 according to the present embodiment may be mounted in a vehicle having an automatic operation function.

In the embodiments, the warning function, the brake assist function, and the automatic brake function have been described as the functions of the safety device. However, the functions of the safety device are not limited to these functions. For example, a function of performing steering operation for avoiding a collision with the target may be employed.

One embodiment provides a vehicle control apparatus for activating, as a safety device, a device configured to avoid a collision of an own vehicle with a target present ahead of and in a travelling direction of the own vehicle or reduce damage of the collision when a risk of the collision is increased. The apparatus includes: a collision time calculation section configured to calculate a time-to-collision, which is a time until the own vehicle and the target collide with each other; an activation region setting section configured to set an activation region to an area present ahead of and in the travelling direction of the own vehicle, the activation region having a predetermined width in a lateral direction that is orthogonal to a path of the own vehicle; a timing setting section configured to set activation timing for determining, by comparison with the time-to-collision, whether or not the safety device is to be activated; a determination region setting section configured to set a determination region to an area present diagonally ahead of and in the travelling direction of the own vehicle, the determination region having a predetermined width in the lateral direction; a timer section configured to measure a time for which the target stays in the determination region; a correction section configured to perform, in a case where the time measured by the timer section is equal to or more than a predetermined value, a correction process as at least one of a process for decreasing the width of the activation region as the time measured by the timer section is longer than a predetermined value and a process for decreasing the activation timing as the time measured by the timer section is longer than the predetermined value; and an activation determination section configured to activate the safety device in a case where a position of the target is in the activation region and the time-to-collision falls below the activation timing.

A longer time for which the target stays diagonally ahead of the own vehicle and in the travelling direction thereof results in a higher probability that the target is travelling in the direction identical or opposite to that of the own vehicle. It can be said that the probability that the target traverses the area present ahead of the own vehicle and in the travelling direction thereof is low. In the above-described configuration, the time for which the target stays in the determination region provided diagonally ahead of the own vehicle and in the travelling direction thereof is measured, and the correction process, which is at least one of the process for delaying the activation timing and the process for narrowing the activation region is performed for a longer time for which the target stays in the determination region. In this manner, unnecessary activation of the safety device for the target having a lower probability that the target traverses the area present ahead of and in the travelling direction of the own vehicle can be reduced.

In addition, for the target travelling in the direction identical or opposite to that of the own vehicle, the probability that the driver recognizes the presence of the target is high, and the probability that the driver performs collision avoidance operation is high. On this point, for the target travelling in the direction identical or opposite to that of the own vehicle, the safety device is less likely to be activated due to the correction process. Hence, the situation where unnecessary activation of various safety devices is performed can be prevented, in advance of the collision avoidance operation performed for a target having a high probability that the driver recognizes the presence of the target.

REFERENCE SIGNS LIST

10 . . . vehicle control apparatus, 12 . . . collision time calculation section, 13 . . . activation region setting section, 14 . . . activation timing setting section, 15 . . . correction section, 16 . . . activation determination section, 17 . . . reference point acquisition section, 18 . . . determination region setting section, 19 . . . timer section, 31 . . . warning device, 32 . . . brake device

The invention claimed is:

1. A vehicle control apparatus for activating a safety device configured to avoid a collision of an own vehicle with a target present ahead of and in a travelling direction of the own vehicle or reduce damage of the collision when a risk of the collision is increased, the apparatus comprising:
a collision time calculator configured to calculate a time-to-collision, which is a time until the own vehicle and the target collide with each other;
an activation region setter configured to set an activation region to an area present ahead of and in the travelling direction of the own vehicle, the activation region having a predetermined width in a lateral direction that is orthogonal to a path of the own vehicle;
a timing setter configured to set activation timing for determining, by comparison with the time-to-collision, whether or not the safety device is to be activated;
a determination region setter configured to set a determination region to an area present diagonally ahead of and in the travelling direction of the own vehicle, the determination region having a predetermined width in the lateral direction;
a timer configured to measure a time for which the target stays in the determination region;
a corrector configured to perform, in a case where the time measured by the timer is equal to or more than a predetermined value, a correction process as at least one of a process for decreasing the width of the activation region compared with a case where the time is shorter than the predetermined value and a process for decreasing the activation timing compared with the case where the time is shorter than the predetermined value; and
an activation determinator configured to activate the safety device in a case where a position of the target is in the activation region and the time-to-collision falls below the activation timing.

2. The vehicle control apparatus according to claim 1, wherein
the determination region setter sets, in the lateral direction, an own-vehicle-side end portion of the determination region far from an end portion position of a horizontal width of the own vehicle.

3. The vehicle control apparatus according to claim 1, wherein
the determination region setter sets, in the lateral direction, the determination region so as to include an end portion of the activation region in the lateral direction.

4. The vehicle control apparatus according to claim 1, further comprising:
a reference point acquisitor configured to acquire a reference point of the determination region based on a position of a stationary portion present ahead of and in the travelling direction of the own vehicle,
wherein the determination region setter sets the determination region as a region extending rightward and leftward from the reference point and in the lateral direction.

5. The vehicle control apparatus according to claim 4, wherein
the corrector further increases an amount of correction in the correction process in a case where the target is positioned far from the reference point than in a case where the target is positioned on an own vehicle side with respect to the reference point.

6. The vehicle control apparatus according to claim 4, wherein
the reference point setter acquires multiple reference points,
the region setter sets the determination region based on each of the reference points,
the timer measures, for each of the determination regions, time for which the target stays, and
the corrector performs the correction process based on one of multiple time measurement results.

7. The vehicle control apparatus according to claim 4, wherein
in a case where the reference point acquisitor no longer acquires the reference point, the determination region setter holds the determination region until a predetermined period is elapsed since the reference point is no longer acquired by the reference point acquisitor.

8. The vehicle control apparatus according to claim 7, wherein
in a case where the reference point acquisitor no longer acquires the reference point, based on the own vehicle travelling straight ahead, the determination region setter holds the determination region until the predetermined period is elapsed since the reference point is no longer acquired by the reference point acquisitor.

9. The vehicle control apparatus according to claim 1, wherein
the determination region setter sets the determination region based on a position relative to the own vehicle.

10. The vehicle control apparatus according to claim 1, wherein
the determination region setter sets the width according to a type of the target.

11. The vehicle control apparatus according to claim 1, wherein
the corrector determines whether or not a driver of the own vehicle has performed operation to avoid the collision, and does not perform the correction process in a case where the operation has been performed.

12. A vehicle control method performed by a vehicle control apparatus configured to activate a safety device configured to avoid a collision of an own vehicle with a target present ahead of and in a travelling direction of the own vehicle or reduce damage of the collision when a risk of collision is increased, the method comprising:
calculating a time-to-collision, which is a time until the own vehicle and the target collide with each other;
setting an activation region to an area present ahead of and in the travelling direction of the own vehicle, the activation region having a predetermined width in a lateral direction that is orthogonal to a path of the own vehicle;
setting activation timing for determining, by comparison with the time-to-collision, whether or not the safety device is to be activated;
setting a determination region to an area present diagonally ahead of and in the travelling direction of the own vehicle, the determination region having a predetermined width in the lateral direction;
measuring a time for which the target stays in the determination region;
performing, in a case where the time measured in the timing step is equal to or more than a predetermined value, a correction process as at least one of a process for decreasing the width of the activation region compared with a case where the time is shorter than the predetermined value and a process for decreasing the activation timing compared with the case where the time is shorter than the predetermined value; and
activating the safety device in a case where a position of the target is in the activation region and the time-to-collision falls below the activation timing.

13. A vehicle control apparatus for activating a safety device configured to avoid a collision of an own vehicle with a target present ahead of and in a travelling direction of the own vehicle or reduce damage of the collision when a risk of the collision is increased, the apparatus comprising:
one or more processors;
a memory storing instructions that when executed by the one or more processors causes the vehicle control apparatus to perform processes comprising:
a collision time calculation process which calculates a time-to-collision, which is a time until the own vehicle and the target collide with each other;
an activation region setting process which sets an activation region to an area present ahead of and in the travelling direction of the own vehicle, the activation region having a predetermined width in a lateral direction that is orthogonal to a path of the own vehicle;
a timing setting process which sets activation timing for determining, by comparison with the time-to-collision, whether or not the safety device is to be activated;
a determination region setting process which sets a determination region to an area present diagonally ahead of and in the travelling direction of the own vehicle, the determination region having a predetermined width in the lateral direction;
a timer process which measures a time for which the target stays in the determination region;
a correction process which performs, in a case where the time measured by the timer process is equal to or more than a predetermined value, at least one of a process for decreasing the width of the activation region compared with a case where the time is shorter than the predetermined value and a process for decreasing the activation timing compared with the case where the time is shorter than the predetermined value; and
an activation determination process which activates the safety device in a case where a position of the target is in the activation region and the time-to-collision falls below the activation timing.

* * * * *